Figure 1:
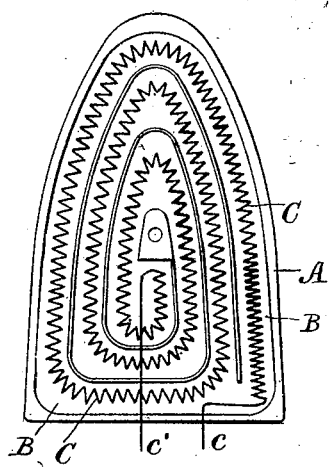

No. 649,726. Patented May 15, 1900.
W. S. HADAWAY, Jr.
PROCESS OF PROTECTING ELECTRIC HEATING CONDUCTORS.
(Application filed Jan. 26, 1898.)

(No Model.)

Attest:
L. Lee
Edw. P. Hensey

Inventor.
William S. Hadaway, Jr.
per Thomas S. Crane, Atty.

UNITED STATES PATENT OFFICE.

WILLIAM S. HADAWAY, JR., OF NEW YORK, N. Y.

PROCESS OF PROTECTING ELECTRIC-HEATING CONDUCTORS.

SPECIFICATION forming part of Letters Patent No. 649,726, dated May 15, 1900.

Application filed January 26, 1898. Serial No. 667,972. (No model.)

*To all whom it may concern:*

Be it known that I, WILLIAM S. HADAWAY, Jr., a citizen of the United States, residing at New York, county of New York, State of New York, have invented certain new and useful Improvements in Processes of Protecting Electric-Heating Conductors, fully described and represented in the following specification and the accompanying drawings, forming a part of the same.

The object of the present invention is to sustain and protect an electric-heating wire when located in or upon a heater-body, so that the insulation may be thoroughly preserved and the heat from the wire be conducted efficiently to the heater-body. These objects are effected by packing iron or steel particles about the insulated wire in the situation intended for use and then oxidizing the said particles of iron or steel into a compact mass. Such mass of rusted iron or steel conducts the heat from the wire rapidly to the heater-body, and it also serves as a most rigid and permanent protector for the insulation upon the heating-wire. The iron or the steel particles are mixed (before they are packed about the insulated wire) with elements, as sal-ammoniac and water, adapted to form iron chlorid, which readily oxidizes to iron oxid. If preferred, the sal-ammoniac may be mixed with the steel particles in a dry condition and moisture applied after the mixture is packed about the wire, the result being the same in either case—namely, the rapid oxidation of the iron or steel particles, which cements them in a solid mass inclosing the insulated conductor.

The invention is especially applicable to such heater-bodies as are used for hot-polishing or smoothing, as smoothing-irons, hot-tables, calender-rolls, and analogous constructions; but the invention is not limited to any particular application.

In practicing the present invention the electric-heating wires are commonly coiled and bent into suitable shape for the location they are to occupy. They are then dipped a number of times into a cream-like mixture of porcelain-clay and water, by which they receive a coating of the clay, which is baked thereon in a suitable oven and converted into porcelain, which may be afterward covered with a suitable glaze by a similar treatment. The coils are then placed in a suitable relation to the heater-body, preferably within a cavity formed in the same adjacent to the surface for applying the heat, and the mixture of iron or steel particles and sal-ammoniac is then packed about the coils within such cavity. When the water is applied to the mixture, a chemical reaction produces the disengagement of chlorin and the rapid conversion of the iron and steel particles into iron chlorid, which oxidizes to iron oxid. The mixture expands during such conversion, and if packed within a cavity it becomes crowded firmly into the same and about the heater-coils, and is thus held permanently in place and maintained in the closest possible contact with the said coils and the heater-body. It is thus enabled most effectively to absorb the heat from the wire coils and to conduct the same to the heater-body. The wire coils may be coated with any refractory insulation and the mass of iron or steel particles rusted about the wires by any suitable means to protect the same and conduct the heat to the heater-body.

The invention will be understood by reference to the annexed drawings, in which—

Figure 2:
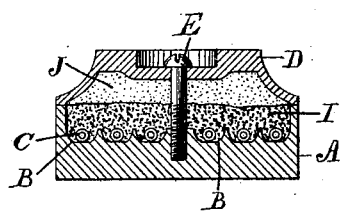
Figure 3:
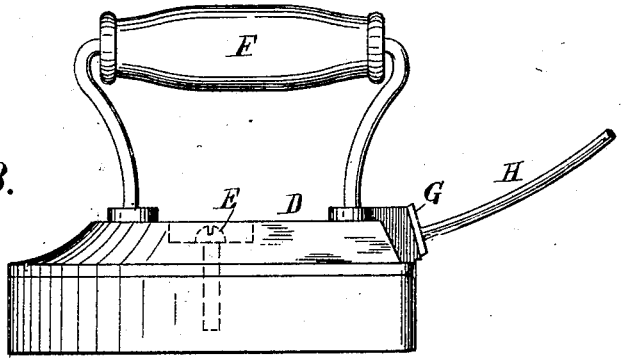

Figure 1 is a plan of the heater-body shaped for use as a smoothing-iron. Fig. 2 is a cross-section of such body with cover secured thereon, and Fig. 3 is a side elevation of the complete iron with electric-cable connection.

A designates the body of the iron, which is shown provided upon the upper side with a recess or cavity having a spiral groove B in the bottom, in which groove electric-wire coils C are disposed. The cover D is shown secured to the body by screw E and is provided with the usual handle F and with a connector-block G, in which the cable H is connected with the terminals $c$ $c'$ of the heater-coils.

In Fig. 2 the coils are shown with double lines to represent the aggregate thickness of the wire and insulating-coating, and the coils are represented as laid in the bottoms of the grooves B with the iron particles I packed all about the same in the space within and above the grooves.

The moisture used to oxidize the iron particles may be dispelled by gently heating the wire coils by an electric current, and when such moisture is dispelled the surface of the mixture may, if desired, be protected from the atmosphere by a cover, as shown in the drawings.

To retain the heat within the body A and to protect the handle F from radiated heat, the cover D is lined with a filling of non-heat-conducting substance J, as plaster-of-paris, which may be applied in a plastic condition when the cover is screwed upon the body A, so as to press upon the top of the iron particles I.

The mixture of iron particles, sal-ammoniac, and water forms, as is well known, a very hard and durable cement, which retains its form and properties for a great length of time, and it thus preserves the coils in the most effective manner.

The invention may be applied in a variety of forms. For instance, where the heating tool or device is unprovided with a cavity the heating-wires and the iron particles rusted thereon may be contained in any suitable metallic case, as a tin or sheet-iron box, for attachment to or contact with such tool or device. In such construction the case inclosing the heating-wires and rusted iron is, in fact, the heater-body and transmits its heat by conduction to the agent or tool which is used for applying the heat.

The essential part of the invention is the use of iron or steel particles rusted in contact with the insulated wire to protect the same and conduct the heat therefrom.

Any agent adapted to decompose water to effect a rapid oxidation of the iron or steel particles would obviously be an equivalent for the sal-ammoniac and may be used in practicing my invention. My improved process furnishes a method of combining the electric-heating wires with a mass of heat-conducting material which is adapted by its hardness and heat-conducting properties to maintain the heating-wires in their adjusted position and to conduct the heat rapidly therefrom to the heater-body.

Having thus set forth the nature of the invention, what I claim herein is—

1. The method of combining electric-heating wires with a mass of heat-conducting material for use upon a heater-body, which consists in, first, coating the heating-wire with a suitable refractory insulation, and coiling or otherwise disposing the wire to suitably radiate its heat; second, packing iron or steel particles about such insulated wire, and, third, oxidizing the metallic particles into a compact mass with such heating-wires, as and for the purpose set forth.

2. The method of securing electric-heating wires within a hollow heater-body, which consists in, first, arranging the heating-wires with suitable insulation within the cavity of the hollow body; second, packing a mixture of iron or steel particles and sal-ammoniac with water about such insulated wire in said cavity, and thereby oxidizing the iron particles and expanding the mixture within the cavity, to secure it therein and obtain a close contact with the said body, substantially as herein set forth.

In testimony whereof I have hereunto set my hand in the presence of two subscribing witnesses.

WILLIAM S. HADAWAY, Jr.

Witnesses:
THOMAS S. CRANE,
EDWARD F. KINSEY.